US008663860B2

(12) United States Patent
Koyama et al.

(10) Patent No.: US 8,663,860 B2
(45) Date of Patent: Mar. 4, 2014

(54) FUEL CELL SYSTEM CONFIGURED TO DETECT FAILURE AND PROCESS FOR DEALING WITH FAILURE OF THE SYSTEM

(75) Inventors: Takatsugu Koyama, Wako (JP); Mitsunori Matsumoto, Wako (JP); Akio Yamamoto, Wako (JP); Hiroyuki Tanaka, Wako (JP); Seiji Tonegawa, Wako (JP); Nobutaka Nakajima, Wako (JP); Shinjiro Morita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1610 days.

(21) Appl. No.: 11/452,285

(22) Filed: Jun. 14, 2006

(65) Prior Publication Data
US 2006/0286420 A1 Dec. 21, 2006

(30) Foreign Application Priority Data

Jun. 17, 2005 (JP) ................................ 2005-177150

(51) Int. Cl.
*H01M 8/04* (2006.01)
*H01M 2/38* (2006.01)
*H01M 2/40* (2006.01)
*H01M 8/24* (2006.01)

(52) U.S. Cl.
USPC ............ 429/431; 429/432; 429/444; 429/456

(58) Field of Classification Search
USPC .................................. 429/431, 432, 444, 456
See application file for complete search history.

(56) References Cited

U.S. PATENT DOCUMENTS

| | | | | |
|---|---|---|---|---|
| 5,413,878 A | * | 5/1995 | Williams et al. | 429/425 |
| 6,638,650 B1 | * | 10/2003 | Bailey et al. | 429/13 |
| 2002/0028362 A1 | * | 3/2002 | Prediger et al. | 429/13 |
| 2002/0051899 A1 | * | 5/2002 | Keskula et al. | 429/17 |
| 2003/0012989 A1 | * | 1/2003 | Ueda et al. | 429/22 |
| 2004/0091756 A1 | * | 5/2004 | Hallum et al. | 429/13 |
| 2004/0126628 A1 | * | 7/2004 | Balliet et al. | 429/13 |
| 2005/0064252 A1 | * | 3/2005 | Kusakabe et al. | 429/13 |

FOREIGN PATENT DOCUMENTS

| | | |
|---|---|---|
| JP | 09-027336 A | 1/1997 |
| JP | 2001-351666 | 12/2001 |

OTHER PUBLICATIONS

Updated machine translation of JP 09-027336 (Yajima et al.; Jan. 28, 1997) relied upon in rejection.*

* cited by examiner

*Primary Examiner* — Eugenia Wang
(74) *Attorney, Agent, or Firm* — Squire Sanders (US) LLP

(57) ABSTRACT

Disclosed is a fuel cell system which includes a fuel cell having an anode and a cathode and for producing electricity through reaction between the fuel gas and the oxidant gas, a fuel gas supply path through which the fuel gas passes, an oxidant gas supply path through which the oxidant gas passes, a voltage sensing device for detecting voltage produced by the fuel cell during power generation, and a decision device for determining whether or not cross leakage occurs between the anode and the cathode of the fuel cell, based on voltage information sent from the voltage sensing device. Moreover, the decision device determines that the cross leakage occurs between the anode and the cathode, if the voltage produced by the fuel cell is less than a predetermined value during the power generation.

5 Claims, 3 Drawing Sheets

FUEL CELL SYSTEM CONFIGURED TO DETECT FAILURE AND PROCESS FOR DEALING WITH FAILURE OF THE SYSTEM

CROSS-REFERENCE TO RELATED APPLICATIONS

This application claims the benefit of Japanese Patent Application 2005-177150 filed on Jun. 17, 2005, the disclosure of which is incorporated herein by reference.

BACKGROUND OF THE INVENTION

1. Field of the Invention

The present invention relates to a fuel cell system and, more specifically, to a fuel cell system configured to deal with its failure.

2. Description of the Related Art

A typical fuel cell stack is constituted as follows. First, an anode (fuel pole) and a cathode (air pole) are arranged on the respective surfaces of a proton exchange membrane, thereby forming a junction material. Second, this junction material is placed between two separators, whereby a single cell is formed. Finally, the multiple single cells are stacked.

Such a fuel cell stack produces water at its cathode (air pole) upon power generation. The part of this water soaks in the proton exchange membrane of each cell, then reaching the anode (fuel pole) side. Furthermore, in order to keep the wetness of the proton exchange membrane, a way to supply wet air (oxidant gas) to the cathode side is typically employed.

Because of the above water and wet air, gas such as fuel gas or oxidant gas flowing in the fuel cell stack contains a large percent of moisture, while the fuel cell stack generates electricity. Once the fuel cell stack stops the generation, the temperature of the gas is lowered so that the moisture in the gas condenses. Therefore, consider the fuel cell stack operates to generate electricity during any given period at low temperatures, for example, in winter or cold climate areas, and it then stops the operation. In this case, the moisture in the gas is prone to be frozen. Subsequently, if the fuel cell stack re-starts the operation, then its operating performance may be made worse.

In consideration of the above problem, a fuel cell system has been proposed in which moisture in the fuel cell stack is eliminated by scavenging the anode or cathode with air. An example of this fuel cell system is described in Japanese Unexamined Patent Application Publication 2001-351666.

This exemplified fuel cell system is provided with a communication path between its fuel gas path and oxidant gas path arranged upstream of the fuel cell stack. Furthermore, an open/close valve is installed in the communication path. When the system stops its operation, the open/close valve is opened. Simultaneously, an air pump supplies scavenging gas (dry air) to the cathode of the fuel cell stack through the oxidant gas path. Subsequently, the scavenging gas (dry air) reaches the anode of the fuel cell stack from the oxidant gas path through the communication path and the fuel gas path. Consequently, the moisture in the fuel cell stack is eliminated.

However, the above fuel cell system has the following disadvantage. Assume that the open/close valve of this system is improperly being opened during power generation. In this case, if the fuel gas path has higher pressure than the oxidant gas path across the opened open/close valve, then fuel gas, that is, hydrogen gas flows into the cathode side of the fuel cell stack. This may cause the deterioration of the fuel cell stack. Hence, a fuel cell system has been in demand that has an ability to determine easily whether the open/close valve fails or not.

Likewise, when cross leakage occurs between the anode and cathode sides of the fuel cell stack upon power generation, the fuel gas, that is, the hydrogen gas flows into the cathode side of the fuel cell stack. In this case, the fuel cell stack may also be deteriorated. Accordingly, a fuel cell system has been in demand that has an ability to determine easily whether or not cross leakage occurs between the anode and cathode sides of the fuel cell stack.

Taking the above demands into account, the present invention has been contrived. An object of the present invention is to provide a fuel cell system capable of determining easily whether or not any failure occurs in an open/close valve (air inlet valve) located in a communication path between a fuel gas path and oxidant gas path of a fuel cell stack. An additional object of the present invention is to provide a fuel cell system capable of determining easily whether or not cross leakage happens between the anode and cathode sides of a fuel cell stack.

SUMMARY OF THE INVENTION

According to a first aspect of the present invention, there is provided, a fuel cell system comprising:
(a1) a fuel cell having an anode and a cathode, the anode being supplied with fuel gas, the cathode being supplied with oxidant gas, the fuel cell for producing electricity through reaction between the fuel gas and the oxidant gas;
(a2) a fuel gas supply path through which the fuel gas passes;
(a3) an oxidant gas supply path through which the oxidant gas passes;
(a4) a voltage sensing device for detecting voltage produced by the fuel cell during power generation; and
(a5) a decision device for determining whether or not cross leakage occurs between the anode and the cathode of the fuel cell, based on voltage information sent from the voltage sensing device,
wherein the decision device determines that the cross leakage occurs between the anode and the cathode, if the voltage produced by the fuel cell is less than a predetermined value during the power generation.

According to a second aspect of the present invention, there is provided, the fuel cell system of the first aspect, further comprising:
(b1) a coupling path for linking the fuel gas supply path to the oxidant gas supply path, and
(b2) an open/close valve being installed on the coupling path, wherein the decision device determines that the open/close valve is kept open, if the voltage produced by the fuel cell is less than a predetermined value during the power generation.

According to a third aspect of the present invention, there is provided, a vehicle equipped with the fuel cell system of either the first or second aspect.

According to a fourth aspect of the present invention, there is provided, a process for dealing with failure of a fuel cell system, the fuel cell system comprising: a fuel cell having an anode and a cathode, the anode being supplied with fuel gas, the cathode being supplied with oxidant gas, the fuel cell for producing electricity through reaction between the fuel gas and the oxidant gas; a fuel gas supply path through which the fuel gas passes; and an oxidant gas supply path through which the oxidant gas passes, said process comprising:
(c1) determining whether or not voltage produced by the fuel cell is less than a predetermined value during power generation of the fuel cell, so that cross leakage is determined to occur between the anode and the cathode of the fuel cell.

With the above system or process, the cross leakage between the anode and cathode of the fuel cell or the failure of the open/close valve can be detected without any difficulty.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A detailed description will be given blow, of first and second embodiments of the present invention with reference to accompanying drawings.

First Embodiment (Structure of Fuel Cell System)

Figure 1:
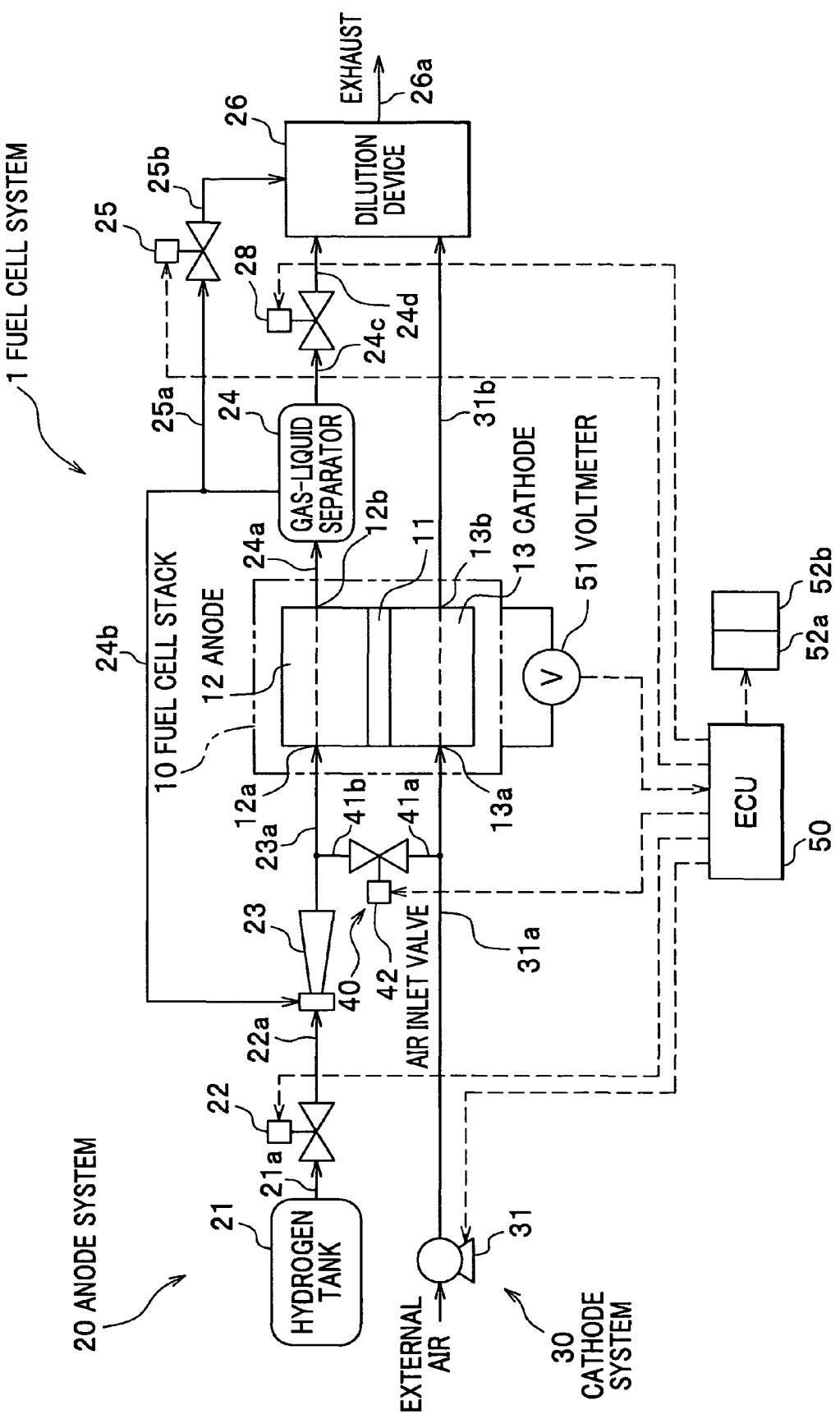
FIG. 1 is a view depicting a general configuration of a fuel cell system according to first and second embodiments of the present invention.

Referring to FIG. 1, a fuel cell system 1 is designed to be installed into a vehicle. This system includes, as main components, a fuel cell stack 10 (fuel cell), an anode system 20, a cathode system 30, a scavenging gas inlet system 40, and an electric control unit (ECU) 50. In this configuration, the anode system 20 discharges fuel gas (hydrogen gas), then supplying it to an anode 12 of the fuel cell stack 10. Meanwhile, the cathode system 30 discharges oxidant gas (dry air), then supplying it to a cathode 13 of the fuel cell stack 10. The scavenging gas inlet system 40 couples the anode system 20 and the cathode system 30 on the upstream side of the fuel cell stack 10. In addition, the system 40 introduces scavenging gas (dry air) from the cathode system 30 to the anode system 20 during a scavenging process of the fuel cell stack 10. The ECU 50 controls the above components.

The scavenging process is performed before and after the power generation of the fuel cell stack 10. Specifically, if the fuel cell stack 10 is applied to a vehicle, the scavenging process is carried out when an ignition switch (not shown) is turned on or off.

(Fuel Cell Stack)

The fuel cell stack 10 is constituted by stacking multiple single cells. Each single cell includes separators (not shown) and a membrane electrode assembly (MEA) being placed therebetween. The MEA is formed by putting the anode 12 (fuel pole) and a cathode 13 (air pole) on the respective surface of a cation-exchange type of proton exchange membrane 11. In FIG. 1, the fuel cell stack 10 is shown as a single cell, but it is actually composed of multiple single cells connected in series so as to produce predetermined voltage.

Each separator has grooves and holes; the grooves are adapted to supply hydrogen gas and dry air (oxygen) to the whole surfaces of the proton exchange membrane 11, and the holes are adapted to supply hydrogen gas and dry air (oxygen) to the cells. Both the hydrogen gas supplied to the anode 12 and the dry air supplied to the cathode 13 produce electrochemical reaction, thereby generating electricity.

(Anode System)

The anode system 20 discharges hydrogen gas, then supplying it to the anode 12 of the fuel cell stack 10. A description will be given below, of the hydrogen gas supply side and discharge side in this order.

(Anode System—Hydrogen Supply Side)

On the hydrogen supply side of the anode system 20, a hydrogen tank 21 containing hydrogen gas, an isolation valve 22 and an ejector 23 are arranged in the downstream direction (or in the direction toward the fuel cell stack 10). The hydrogen tank 21 is coupled to the isolation valve 22 through a pipe 21a, and the isolation valve 22 is coupled to the ejector 23 through a pipe 22a. Moreover, the ejector 23 is coupled to a fuel inlet port 12a through a pipe 23a, and the fuel inlet port 12a is linked to the anode 12 of the fuel cell stack 10. The isolation valve 22 is electrically connected to the ECU 50, and it is opened/closed in response to a signal sent from the ECU 50. In addition, the pipe 22a is provided with a pressure-reducing valve (not shown).

In the above structure, once the isolation valve 22 is opened in response to the signal from the ECU 50, the hydrogen tank 21 discharges hydrogen gas. This hydrogen gas is depressurized to a predetermined value, and is then supplied to the anode 12 of the fuel cell stack 10. In this embodiment, a path through which hydrogen gas (fuel gas) passes is constituted by the pipe 21a, isolation valve 22, pipe 22a, ejector 23 and pipe 23a.

(Anode System—Hydrogen Discharge Side)

On the hydrogen discharge side of the anode system 20, a gas-liquid separator 24, a hydrogen purge valve (scavenging valve) 25, and a dilution device 26 for diluting unreacted hydrogen gas are arranged.

The gas-liquid separator 24 isolates water from gas exhausted from the anode 12 of the fuel cell stack 10, thereby eliminating the water from the exhaust gas. This separator is coupled through the pipe 24a to the downstream side of a fuel outlet 12b linked to the anode 12 of the fuel cell stack 10. The gas-liquid separator 24 has a coolant pipe (not shown) through which a coolant passes. This separator 24 cools down the exhaust gas coming from the pipe 24a to a predetermined temperature, thereby extracting unreacted hydrogen gas from water. However, the method which the gas-liquid separator 24 employs is not limited to the above-described one. Alternatively, it may employ the centrifuge separation method, for example.

The downstream side of the gas-liquid separator 24 is coupled to the ejector 23 through a pipe 24b, as well as to the dilution device 26 through pipes 24c and 24d. The separated, unreacted hydrogen gas is made to flow back to the ejector 23 through the pipe 24b. This pipe 24b is installed to a predetermined place on the gas-liquid separator 24 such as an upper wall, so that the hydrogen gas is circulated. The pipe 24c is installed to a predetermined place on the gas-liquid separator 24 such as a bottom wall in order to exhaust the separated water (liquid). A drain valve 28 is placed between the pipes 24c and 24d, and it is opened/closed suitably whereby the water stored in the gas-liquid separator 24 is delivered to the dilution device 26 as drain water.

The upstream side of the hydrogen purge valve 25 is coupled to a midway position on the pipe 24*b* through the pipe 25*a*. Meanwhile, the downstream side of the hydrogen purge valve 25 is coupled to the dilution device 26 through the pipe 25*b*. The hydrogen purge valve 25 is opened when impurities such as water or nitrogen gas in the circulated hydrogen gas is increased or when the scavenging process of the fuel cell stack 10 is performed.

The dilution device 26 has a dilution space within, and it dilutes anode gas including the unreacted hydrogen gas received from the pipe 25*b* when the hydrogen purge valve 25 is opened. The upstream side of the dilution device 26 is coupled to the pipe 25*b*, pipe 24*d* and pipe 31*b*. On the downstream side of the dilution device 26, a pipe 26*a* is provided in order to exhaust outside the diluted hydrogen gas or drain water including the water separated by the gas-liquid separator 24 and introduced to the dilution device 26.

(Cathode System)

The cathode system 30 discharges air, then supplying it to the cathode 13 of the fuel cell stack 10. Note that the discharged air is typically wet air, but it is dry air during the scavenging process. A description will be given below, of an air supply side and air discharge side in the cathode system 30 in this order.

(Cathode System—Air Supply Side)

On the air supply side of the cathode system 30, a compressor (oxidant supply device) 31 and a pipe 31*a* are arranged in the downstream direction or in the direction toward the fuel cell stack 10. The compressor 31 is coupled to an air supply inlet 13*a* linked to the cathode 13 of the fuel cell stack 10 through the pipe 31*a*. External air compressed by the compressor 31 is supplied to the cathode 13 of the fuel cell stack 10 through the pipe 31*a* and the air supply inlet 13*a*. Moreover, a humidifier (not shown) is provided on the pipe 31*a*, and it allows the air to be wet when the fuel cell stack 10 generates electricity. In this embodiment, a path through which the oxidant gas passes is constituted by the pipe 31*a*.

(Cathode System—Air Discharge Side)

On the air discharge side of the cathode system 30, an air exhaust outlet 13*b* is linked to the cathode 13 of the fuel cell stack 10 and it is coupled to the dilution device 26 through the pipe 31*b*. Due to the above arrangement, the cathode exhaust gas discharged from the air exhaust outlet 13*b* is supplied to the dilution device 26 through the pipe 31*b*. Note that the cathode exhaust gas contains both wet or dry air and the generated water. The pipe 31*b* is provided with a backpressure valve (not shown) This backpressure valve allows the back pressure to be regulated. Thus, both the pressure of the hydrogen gas supplied to the anode 12 and the pressure of the air supplied to the cathode 13 are kept in balance. This contributes to an improvement in the lifetime of the proton exchange membrane 11.

(Scavenging Gas Inlet System)

The scavenging gas inlet system 40 includes the pipes 41*a* and 41*b* and an air inlet valve 42. The combination of the pipes 41*a* and 41*b* serves as a path for coupling the pipe 23*a* of the anode system 20 and the pipe 31*a* of the cathode system 30. The air inlet valve 42 functions as an open/close valve provided between the pipes 41*a* and 41*b*. The air inlet valve 42 is electrically connected to the ECU 50 and it is opened/closed in response to a signal from the ECU 50. The air inlet valve 42 is closed while the fuel cell stack 10 generates electricity. Meanwhile, during the scavenging process of the fuel cell stack 10, the air inlet valve 42 is opened so that scavenging gas (dry air) is introduced from the cathode system 30 to the anode system 20 through the pipes 41*a* and 41*b*.

(ECU)

The ECU 50, which serves as a decision device, controls the operation of the whole fuel cell system 1, including the open/close of the isolation valve 22, hydrogen purge valve 25, drain valve 28 and air inlet valve 42 and the start/stop of the compressor 31. Examples of the ECU 50 include a central processing unit (CPU), a read only memory (ROM), a random access memory (RAM) and various interfaces. In addition, the ECU 50 determines whether the air inlet valve 42 fails or not, based on voltage information sent from a voltmeter 51. Note that the voltmeter 51 senses the output voltage of the fuel cell stack 10 during the power generation. If the ECU 50 determines that the air inlet valve 42 fails, then the ECU 50 directs the isolation valve 22 to be opened, the compressor 31 to be stopped, and a warning indicator 52*a* to be turned on as will be described in detail later. Similarly, the warning indicator 52*b* is turned on when cross leakage occurs between the anode 12 and the cathode 13 of the fuel cell stack 10 in a second embodiment (described later).

The voltmeter 51 senses the output voltage of the whole fuel cell stack 10 in this embodiment. However, the present invention is not limited thereto. Alternatively, it may be a cell voltmeter that senses the voltages of individual single cells.

(Operation of Fuel Cell System)

Figure 2:
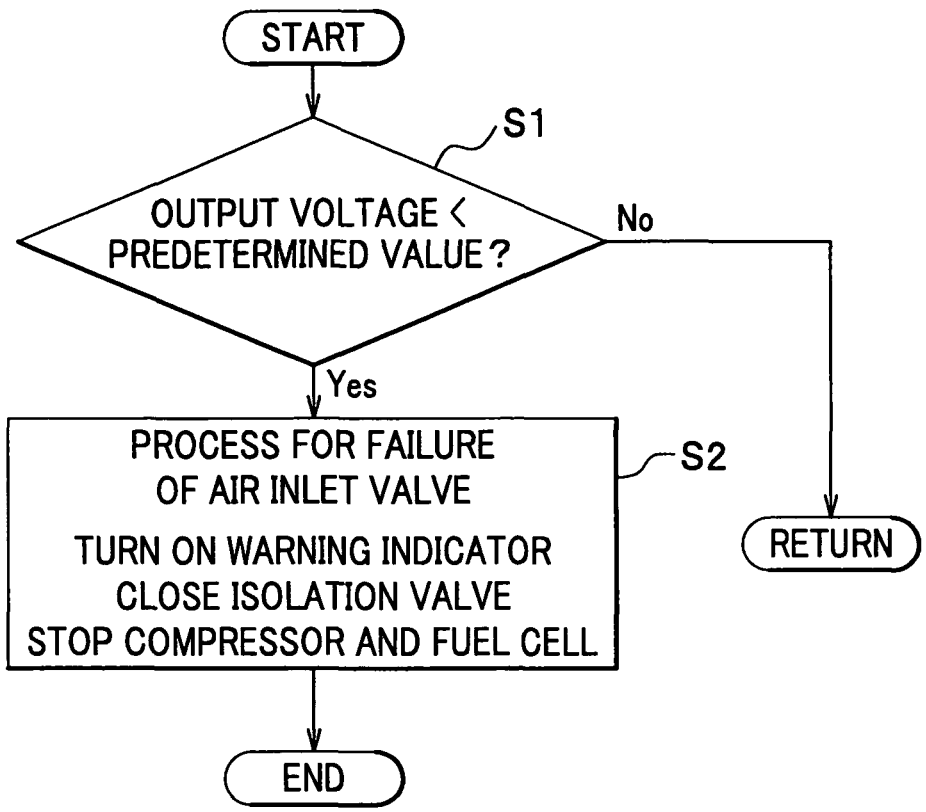
FIG. 2 is a flowchart showing an operation of an ECU while the fuel cell system of the first embodiment generates electricity.

Next, a detailed description will be given below, of the operation of the fuel cell system 1 when the fuel cell stack 10 generates electricity, with reference to FIGS. 1 and 2.

First, the fuel cell system 1 starts its operation. In other words, the ignition is turned on. Following this, the air inlet valve 42 and the drain valve 28 are opened and the compressor 31 is operated in response to the signals from the ECU 50, so that scavenging process is performed. Furthermore, both the isolation valve 22 and the hydrogen purge valve 25 are closed. This makes it possible to supply the air (dry air), which the compressor 31 blows, to the anode 12 of the fuel cell stack 10 through the pipe 31*a*, pipe 41*a*, air inlet valve 42, pipe 41*b*, pipe 23*a* and fuel inlet port 12*a*. Also, the air is supplied to the cathode 13 of the fuel cell stack 10 through the pipe 31*a* and the air supply inlet 13*a*. Consequently, the interiors of the anode 12 and the cathode 13 in the fuel cell stack 10 are scavenged, so that water, impurities, etc are eliminated.

The scavenging process terminates after a predetermined period. Then, the fuel cell stack 10 starts generating electricity. During the power generation, the isolation valve 22 is opened and the air inlet valve 42 is closed in response to the signals from the ECU 50. In addition, the drain valve 28 is opened, the hydrogen purge valve 25 is closed, and the compressor 31 starts its operation.

As a result, the hydrogen gas in the hydrogen tank 21 is supplied to the anode 12 of the fuel cell stack 10 through the pipe 21*a*, isolation valve 22, pipe 22*a*, ejector 23, pipe 23*a* and fuel inlet port 12*a*. Moreover, the compressor 31 allows wet air (oxidant gas) to be supplied to the cathode 13 of the fuel cell stack 10 through the pipe 31*a*, humidifier (not shown) and air supply inlet 13*a*. Subsequently, the hydrogen gas supplied to the fuel cell stack 10 electrochemically reacts with the oxygen gas (wet air). As a result of the reaction, electricity is generated, and the electricity is then supplied to external loads such as motors.

Furthermore, during the power generation, the anode gas is exhausted from the fuel outlet 12*b* of the anode 12, and this gas enters the gas-liquid separator 24 via the pipe 24*a*. The gas-liquid separator 24 decomposes the anode gas into unreacted hydrogen gas and water. The separator 24 then returns the unreacted hydrogen gas to the ejector 23 through the pipe 24b, and delivers the water to the dilution device 26 via the pipe 24c, drain valve 28 and pipe 24d. Meanwhile, the cathode gas including wet air and water is exhausted from the air exhaust outlet 13b of the cathode 13 during the power generation. This cathode gas is supplied to the dilution device 26 via the pipe 31b. Following this, the dilution device 26 exhausts the cathode gas and the water outside through the pipe 26a.

While the fuel cell stack 10 generates electricity, the ECU 50 determines whether the air inlet valve 42 fails or not, based on the voltage information from the voltmeter 51. Specifically, referring to FIG. 2, the ECU 50 determines whether or not the output voltage of the fuel cell stack 10 exceeds a predetermined value, based on the voltage information (step S1). Based on this determination result, the ECU 50 detects the failure of the air inlet valve 42. In this case, the predetermined value represents a lower limit below which external loads such as motors can no longer operate.

It can be noted that the output voltage of the fuel cell stack 10 drops as a current drawn from the fuel cell stack 10 is increased. Therefore, the predetermined value must be set in consideration of this drawn current.

The air inlet valve 42 is typically being closed during the power generation. However, the air inlet valve 42 may be kept open due to failure, etc. Assume that the air inlet valve 42 is being opened during the power generation. In this case, for example, if the path for supplying hydrogen in the anode system 20 has higher pressure than the path for supplying oxygen in the cathode system 30, then the hydrogen gas will flow into the cathode 13 through the air inlet valve 42. This may cause the deterioration of the fuel cell stack 10.

Figure 3:
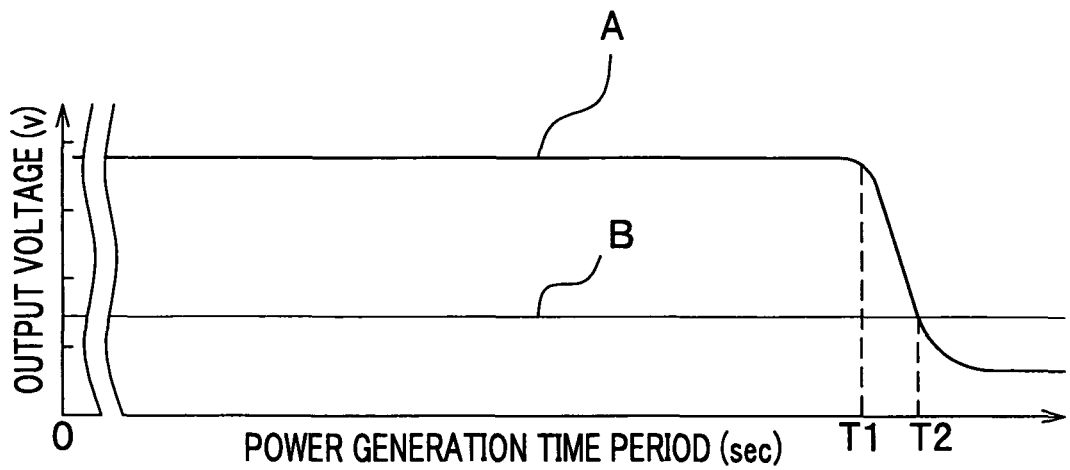
FIG. 3 is a graph showing a relation between a power generation time period and output voltage of the fuel cell system.

Referring to FIG. 3, a line A denotes the voltage produced by the fuel cell stack 10, a line B denotes a preset voltage value (lower limit), and a time point T1 denotes time when the air inlet valve 42 gets damaged. As is clear from a graph of FIG. 3, the voltage produced by the fuel cell stack 10 drops at about the moment when the air inlet valve 42 gets damaged. Specifically, the output voltage of the fuel cell stack 10 (line A) overlaps with the preset voltage value (line B) at a time point T2.

If the voltage produced by the fuel cell stack 10 falls below the preset voltage value ("Yes" at step S1 of FIG. 2), then the ECU 50 determines that the air inlet valve 42 fails. In response to this determination result, the process goes to a step S2. Otherwise ("No" at step S1), the process goes to a return, and the step S1 will be repeated.

At the step S2, the ECU 50 performs the following process. The ECU 50 turns on the warning indicator 52a in order to alert a driver (or passenger(s)) to the failure of the air inlet valve 42. At the same time, the ECU 50 closes the isolation valve 22, and stops the operations of the compressor 31 and of the fuel cell stack 10.

As described above, while the fuel cell system 1 generates electricity, the ECU 50 detects the failure of the air inlet valve 42, based on the voltage information from the voltmeter 51. If the output voltage of the fuel cell stack 10 is less than a predetermined value, in other words, if the air inlet valve 42 is determined to fail, then the ECU 50 closes the isolation valve 22, and stops the operations of the compressor 31 and of the fuel cell stack 10. Consequently, it is possible to prevent the deterioration of the proton exchange membrane 11, etc of each single cell in the fuel cell stack 10.

In this embodiment, the description has been given on the premise that the path for supplying hydrogen in the anode system 20 has higher pressure than the path for supplying oxygen in the cathode system 30. In contrast to this, it can be considered that the path of the anode system 20 has lower pressure than the path of the cathode system 30. In this case, the air is prone to enter the anode 12 of the fuel cell stack 10 through the air inlet valve 42, thereby causing the deterioration of the fuel cell stack 10. In this situation, the output voltage of the fuel cell stack 10 also drops to less than the predetermined value, in other words, the air inlet valve 42 is also determined to fail. Hence, the ECU 50 closes the isolation valve 22, and stops the operations of the compressor 31 and of the fuel cell stack 10. As a result, it is also possible to prevent the deterioration of the proton exchange membrane 11, etc of each single cell in the fuel cell stack 10.

Second Embodiment

Since a fuel cell system of a second embodiment is similar to that of the first embodiment, overlapped portions will be omitted from the following description.

In this embodiment, the ECU 50 determines whether or not cross leakage occurs between the anode 12 and the cathode 13 of the fuel cell stack 10, based on the voltage information from the voltmeter 51 during the power generation. A detailed description will be given below, of an operation of the ECU 50, with reference to a flowchart shown in FIG. 4.

Figure 4:
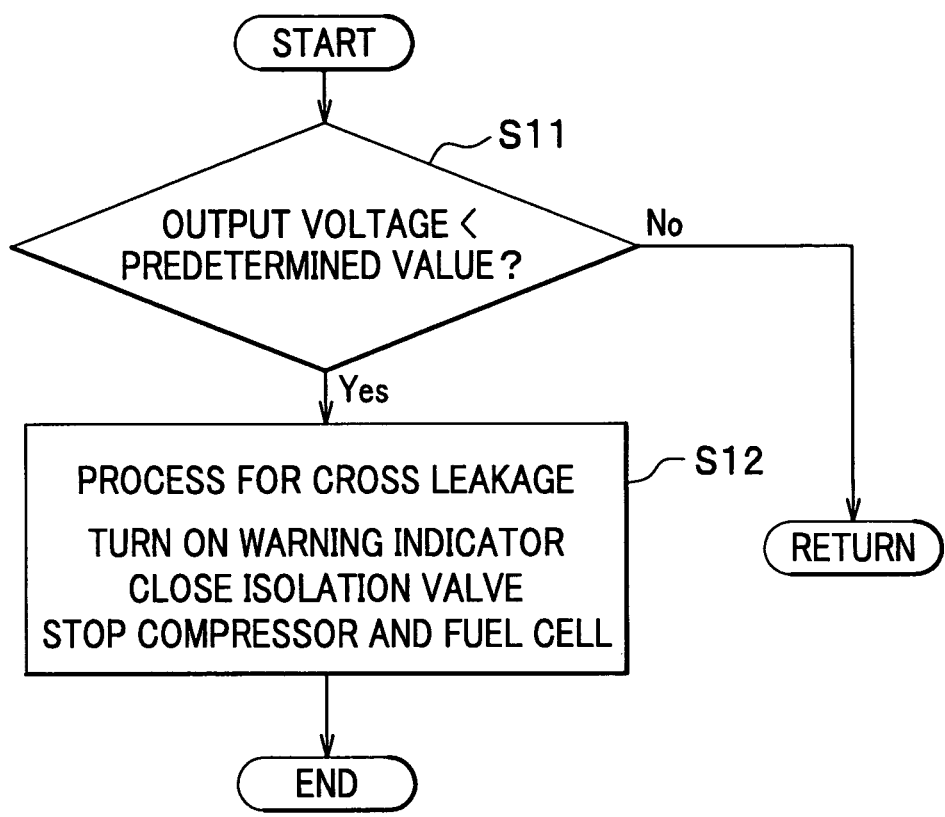
FIG. 4 is a flowchart showing an operation of the ECU while the fuel cell system of the second embodiment generates electricity.

While the fuel cell stack 10 generates electricity, the ECU 50 determines easily whether or not cross leakage occurs between the anode 12 and the cathode 13 of the fuel cell stack 10, based on the voltage information from the voltmeter 51. Specifically, as shown in FIG. 4, the ECU 50 determines whether or not the voltage produced by the fuel cell stack 10 exceeds a predetermined value having been preset (step S11). Based on the determination result, the ECU 50 detects the occurrence of the cross leakage between the anode 12 and the cathode 13. This predetermined value represents a lower limit below which external loads such as motors can no longer operates. Furthermore, as a current drawn from the fuel cell stack 10 is increased, the output voltage of the fuel cell stack 10 drops. Accordingly, the predetermined value must be set in consideration of the extracted current.

If cross leakage occurs between the anode 12 and the cathode 13 during the power generation, then the fuel cell stack 10 is degraded. Due to this fact, the output voltage of the fuel cell stack 10 is lowered at about the moment when the cross leakage appears as in the case of the failure in the air inlet valve 42 (see FIG. 3).

If the output voltage of the fuel cell stack 10 falls below the predetermined value ("Yes" at step S11), then the ECU 50 determines that cross leakage occurs between the anode 12 and the cathode 13 of the fuel cell stack 10. Following this, the process goes to a step S12. Otherwise ("No" at step S11), the process goes to a return, and the step S11 will be repeated.

At the step S12, the ECU 50 performs the following process. The ECU 50 turns on the warning indicator 52b, thereby alerting a driver (or passenger(s)) to the cross leakage between the anode 12 and the cathode 13 of the fuel cell stack 10. Simultaneously, the ECU 50 closes the isolation valve 22, and stops the operations of the compressor 31 and of the fuel cell stack 10.

As described above, in the fuel cell system 1 according to the second embodiment, the ECU 50 determines whether or not cross leakage occurs between the anode 12 and the cathode 13 of the fuel cell stack 10, based on the voltage information from the voltmeter 51 during the power generation. If the output voltage of the fuel cell stack 10 falls below a predetermined value, in other words, if cross leakage is determined to occur, then the ECU 50 closes the isolation valve 22, and stops the operations of the compressor 31 and of the fuel cell stack 10. As a result, it is possible to prevent the deterioration of the proton exchange membrane 11, etc of each single cell in the fuel cell stack 10.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A process for dealing with failure of a fuel cell system, the fuel cell system comprising:
    a fuel cell having an anode and a cathode, the anode being supplied with fuel gas, the cathode being supplied with oxidant gas, the fuel cell for producing electricity through reaction between the fuel gas and the oxidant gas;
    a fuel gas supply path through which the fuel gas passes;
    an oxidant gas supply path through which the oxidant gas passes;
    a coupling path for linking the fuel gas supply path to the oxidant gas supply path;
    an open/close valve being installed on the coupling path;
    an electric control unit being electrically connected to the open/close valve and sending the open/close valve a signal, in response to which the open/close valve is opened/closed, wherein the electric control unit closes the open/close valve while a fuel cell stack is generating electricity if the electric control unit determines that the open/close valve does not fail, and wherein the electric control unit opens the open/close valve during a scavenging process of the fuel cell stack if the electric control unit determines that the open/close valve does not fail;
    a voltage sensing device for detecting voltage produced by the fuel cell during power generation, wherein the voltage is supplied to an external load operatively connected to the fuel cell; and
    a decision device for determining whether or not an abnormal condition occurs in the fuel cell system, based on voltage information sent from the voltage sensing device, wherein
    the decision device determines that the open/close valve is kept open improperly if the electric control unit determines that the open/close valve fails during power generation if the voltage produced by the fuel cell is less than a predetermined value, wherein the predetermined value is determined during power generation of the fuel cell with the open/close valve kept closed, and wherein the predetermined value is set in consideration of a current drawn from the fuel cell.

2. The process according to claim 1,
    wherein the fuel cell system further comprises a warning device,
    said process further comprising activating the warning device, if the voltage produced by the fuel cell is less than the predetermined value.

3. The process according to claim 1,
    wherein the fuel cell system further comprises an oxidant supply device for supplying the oxidant gas to the cathode,
    said process further comprising halting an operation of the oxidant supply device, if the voltage produced by the fuel cell is less than the predetermined value.

4. The process according to claim 1,
    wherein the voltage sensing device detects an output voltage of a whole fuel cell stack supplied to the external load, and
    the predetermined value is set in consideration of the drawn current.

5. The process according to claim 1,
    wherein the voltage sensing device detects an output voltage of a whole fuel cell stack supplied to the external load, and
    the predetermined value is a lower limit below which the external load can no longer operate.

* * * * *